United States Patent
Steele et al.

(10) Patent No.: US 8,014,025 B2
(45) Date of Patent: Sep. 6, 2011

(54) SYSTEM AND METHOD FOR OUTPUTTING A JOB

(75) Inventors: John S. Steele, Lexington, KY (US); Edward B. Ghazalian, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 1089 days.

(21) Appl. No.: 11/294,192

(22) Filed: Dec. 5, 2005

(65) Prior Publication Data
US 2007/0127069 A1   Jun. 7, 2007

(51) Int. Cl.
G06F 15/00   (2006.01)
G06F 3/12    (2006.01)
G06K 15/02   (2006.01)

(52) U.S. Cl. ......... 358/1.9; 358/1.15; 358/1.1; 358/1.16
(58) Field of Classification Search .................. 358/1.9, 358/1.1, 1.13, 1.15, 1.16, 501, 401, 403
See application file for complete search history.

(56) References Cited

U.S. PATENT DOCUMENTS

| | | | |
|---|---|---|---|
| 5,699,495 A | 12/1997 | Snipp | |
| 6,201,611 B1 | 3/2001 | Carter et al. | |
| 6,405,310 B1 | 6/2002 | Simpson | |
| 6,678,068 B1 | 1/2004 | Richter et al. | |
| 6,704,117 B1 | 3/2004 | Chintakrindi et al. | |
| 7,031,004 B1* | 4/2006 | Hayward et al. | 358/1.15 |
| 2002/0030840 A1* | 3/2002 | Itaki et al. | 358/1.13 |

* cited by examiner

*Primary Examiner* — Thomas J Lett (57) ABSTRACT

A universal output control system and method for outputting an output job at a target output location wherein a universal user interface facilitates access to and control of a plurality of output devices located on a network or at an output center such that specific details of each output device are encapsulated. The universal user interface provides searches of available output devices in a network, wherein printer drivers are automatically installed as needed. Alternatively, an output management application service stores an output job until output job data is generated for controlling the output of the output job on the selected output device, at which time the output job is output on the selected output device per the output job data. If the target output location is an output device on a network, an output device database service captures and generates the output job data. If the target output location is an output device at an output center, an output center interface is launched for capturing and generating the output job data.

20 Claims, 7 Drawing Sheets

SYSTEM AND METHOD FOR OUTPUTTING A JOB

FIELD OF THE INVENTION

The present invention relates generally to methods, devices, and processes for controlling distributed output devices and services on personal, local, and wide area networks, with application to a print control system and method having a common user interface for providing access to one or more output devices and services of varying format.

BACKGROUND OF THE INVENTION

Electronic information stored in and manipulated with computerized devices are often output into either a tangible form or transformed into another electronic data format for transport using different systems. Computerized devices can include, but are not limited to, workstations, laptops, servers, personal digital assistants, and a multitude of other devices that can all be referred to generally as "computers." Computer users have access to a multitude of methods for outputting information including generating hardcopy through different printing means such as laser, inkjet, wax transfer, and offset printers, as well as, other personal, office, and publication reproduction technologies. For solid objects, such as engineering designs, specific output means can include different types of prototyping equipment including stereolithography, 3D printers, and selective laser sintering. Alternative methods of outputting information include creating different types of representations of data: creating facsimiles (faxes) for electronic transmission using fax transmission protocols and duplicating electronic information into physically transportable storage media by, for example, creating Compact Disc (CD) or Digital Video Disk (DVD) copies of information.

A computer network can generically be described as a system for communication between multiple computers, including embedded devices or service provides. Computer networks can be broken into three major sub-categories of computer networks: Personal Area Networks (PANs), Local Area Networks (LANs) and Wide Area Networks (WANs). A PAN allows communication between devices and computers located close to a single person. An example of a PAN network is one formed using Bluetooth (IEEE 802.15 standard) enabled wireless devices in the vicinity of a user or Firewire (IEEE 1394 standard). A LAN is a computer network covering a local geographic area like a home, office, or group of buildings in a similar geographic location. A LAN may use a combination of different network architectures and infrastructures including, but not limited to, wireless Wi-Fi (IEEE 802.11(x) standard) and Ethernet (IEEE 802.3 standard—wired and fiberoptic) networks. In contrast, a WAN typically covers a wide geographic area with large numbers of computers. The Internet is an example of a WAN. A WAN network may be comprised of a number of separate LANs networked together over external network interfaces, including virtual tunnels such as Virtual Private Networks (VPN) constructed through a public medium such as the Internet. All of these networks enable the rapid flow of information from one computer or device to another. This makes it easy for a computer to access disparate equipment, such as printers, scanners, fax, and other output devices, that may be located at any distance from the user—either close to the user or at a large geographic distance away.

The interconnectivity of computers and output devices, however, makes it more difficult for a given user to access the output devices. Commonly, it is necessary for a user to know both the locations and capabilities of output devices. Also, a user must be able to manipulate vendor specific control panels (user interfaces) to access and operate the different types of output devices since each such user interface is vendor specific. For example, the different user interfaces may place different output capabilities in different locations on the user interface or describe common features using different terms. Thus, in many network environments, users will frequently only use a small number of the available output devices and will fail to take advantage of advanced capabilities of various devices.

Therefore, there is a need for a system and method for providing a user with easy access to a number of different types of output devices within a computer network such that a common or universal user interface facilitates the operation of all connected output devices. This system and method should enable a user to be presented with a common or universal user interface when accessing an output devices regardless of the specific make or manufacturer of the output device. There is also a need to enable an abstraction of output device details away from the user, making it easier to access and use the output device while enabling easier maintenance and service of networked output devices or output devices located at an output center. There is still a further need for a user to manage the capabilities and locations of differing output devices in order to improve, optimize, and make more effective use of network output resources.

SUMMARY OF THE INVENTION

The present invention solves the problems associated with the prior art by providing a universal output control system having a common or universal user interface for controlling and managing access to a plurality of output devices, whether such output devices are connected directly to a network or accessible at an output center. In the present invention, an output device control system and method for generating output of electronic data is disclosed.

In an illustrative embodiment, a universal user interface is launched on a user's computer that provides multiple tier searches of available output devices, such as printers, in a network to which the computer is connected. The user is presented with several different methods for selecting an output device. For example, the user is presented with the most recently used output devices, or alternatively, the user may search for local or remote printers that satisfy a given filter criteria, thereby providing the user with a multiple tier searching method. The universal user interface may either issue a local query for local output devices or may search a complete database of available output devices that is maintained on or accessible via a network server. Upon selecting an output device, the universal user interface automatically installs the device driver for the selected device if is has not already been installed on the user's computer. At any time in the process, the user may select a different output device and/or select different print options before submitting an output job, such as a document, for print.

In an alternative embodiment, an output device management application service stores an output job, such as a text document, to be output, such as printed, on a selected output device, such as a printer. A user interface facilitates the entry of output device options needed to output the output job on the selected output device. The selected output device may either be directly connected to the user via a network or may be located at an output center, such as FedEx Kinkos. The user interface provides a common set of command options for a common class of output devices, thereby encapsulating all of the output device details from the user. The information submitted by the user through the user interface is then translated into job data specific for the selected output device. The job data are then combined with the output job in order to create a device specific integrated output job. The integrated output job is then rendered into either a tangible form, such as printed, or an alternative electronic form, such as a facsimile by the selected output device.

The present invention also enables a user to output electronic data at widely separated document processing or print or output centers, such as FedEx Kinkos, which are accessible via a WAN. In this embodiment, the user interface initiates or launches an output center interface for capturing the user's configuration options, or output device options, for a selected output device at the output center. The output center stores the output device options selected by the user and upon receipt of the output job, outputs the output job on the selected output device using the output device options. It should be understood that this summary is presented only to provide a synopsis of the present invention by describing illustrative embodiments. This summary is not to be a limitation on any aspect of the invention.

BRIEF DESCRIPTION OF THE DRAWINGS

The accompanying figures depict several embodiments of the universal output device. A brief description of each figure is provided below. Elements with the same reference numbers in each figure indicate identical or functionally similar elements. Additionally, the left-most digit(s) of a reference number identifies the drawings in which the reference number first appears.

DETAILED DESCRIPTION

Figure 1:
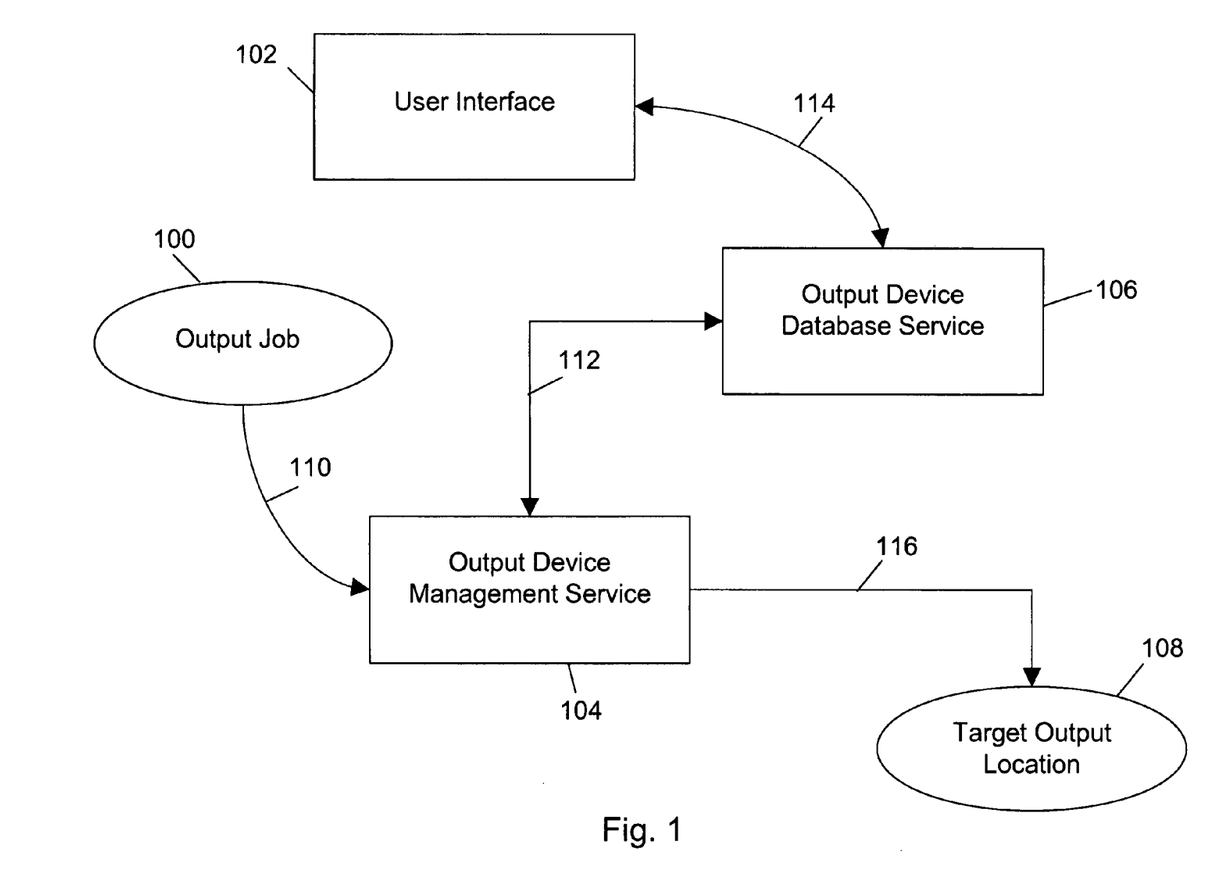
FIG. 1 is a block diagram showing the functional elements of an embodiment of the universal output control system.

FIGS. 1-5 show a first embodiment of the universal output device control system of the present invention. FIG. 1 is a block diagram showing the functional elements of the present invention and their interconnections. The output data file, generic output, print job, or more generally, output job 100 to be submitted for output on a target object location 108 is prepared by the user using his/her normal processes. The target object location 108 is either an output device, such as a printer, facsimile, or multi-function device capable of performing printing in addition to at least one other function such as scanning, copying or faxing, that is connected directly via a network or is an output device located at a third party vendor, or output center, such as a FedEx Kinko's or UPS store.

An output job 100, such as a document or file, targeted for output on a printer may be pre-processed and encoded in device independent formats such as Postscript, Printer Command Language (PCL), Advanced Function Printer/Presentation (AFP), Portable Document Format (PDF), or Tag Image File Format (TIFF) to name only a few examples. Alternatively, an output job 100 is retained in a native application format or encoded into yet another intermediate format or even a specific printer-ready format using a printer driver that is installed locally. In the case of other, non-printer, types of output devices, the output job 100 is encoded directly into an appropriate format. For example, if the output device is a facsimile machine then the output job 100 may already be encoded into the appropriate protocol format or in the case of a rapid prototyping machine into a device independent format such as a stereolithography (STL) file. Regardless of the type of output device utilized, the output job 100 is formatted and prepared for communication in either the native document format, an intermediate format, a device independent format, or alternatively, in a device specific format.

The output job 100 is transferred over a communication link 110 to an output device management service 104. In this embodiment, the output device management service 104 is an independent server; however this is for convenience only. The output device management service 104 may execute in a number of different locations. For example, it may be a logical storage location having processing capability within either the user's computer or another networked computer capable of running the output device management service 104 thread when needed. Alternatively, it might also be a standalone system or server with dedicated storage and processing capabilities.

The output device management service 104 nominally has access to three components: processor, storage, and communication means. The processor may take a number of forms including: microprocessors, microcontrollers, digital signal processing (DSP) chips, and application specific integrated circuits (ASICs) to name only a few examples. The processor merely needs to be capable of manipulating the output job 100 data streams and any output device job data, described in detail below, in order to create an integrated output job 100 suitable for delivery to the output device at the selected target output location 108.

The output device management service 104 also has a series of conventional communication interfaces necessary to connect with the communication links 110, 112, and 116. These communication interfaces enable the output device management service 104 to accept information, such as the output job 100 and any output device specific command information, or output job data, from an output device database service 106, and to communicate via communication link 116 with the selected output device in both the transmission of an integrated output job to the output device at the target output location 108 and in receiving confirmation and status information back. Finally, the output device management service 104 may also communicate back to the user to report on the status of outputting the output job. For example, the output device management service 104 informs the user that the output job is completed. These communication links 110, 112, and 116 may be a combination of PAN, LAN, and WAN links such as Bluetooth (IEEE 802.15 standard), Wi-Fi (IEEE 802.11(x) standard), Ethernet (IEEE 802.3 standard—wired and fiberoptic), the Internet, and/or similar systems. The communication links 110, 112, and 116 may also be more traditional device communications links such as RS-232 serial, parallel, Universal Serial Bus (USB), Firewire, (IEEE 1394 standard), and/or a system communication bus such as Peripheral Component Interconnect (PCI), PCI Express, and VERSAmodule Eurocard (VME). The type of communications links described here are indicative of some of the many modes of information transfer at the disposal to one of ordinary skill in the art The output device management service 104 also optionally has a means of storing information. This means of storing information may take multiple forms or combinations hereof, including, but not limited to, dynamic memory (RAM), non-volatile memory, magnetic storage, and other mutable storage devices. For example, the output device management service 104 may contain a combination of two or more types of memory. A small amount of dynamic memory may be coupled with a slower but greater capacity storage device such as a hard drive which can increase the quantity of data stored by swapping data back and forth from memory. The output device management service 104 may alternatively share memory with other processes in an integrated device. In another alternative, the output device management service 104 may only have enough memory to run the set of instructions (program) needed to achieve the device functionality and to point to specific external locations. In such embodiment, the output device management service 104 communicates with other storage locations that hold the output job 100 until it is ready to be used and transmitted across the communication link 110.

The logical operations that occur in the output management application server are outlined in FIG. 5 and described in greater detail below. The logical operations which drive the output device management service 104 functionality may be embedded in a number of different locations including within an operating system running on a general purpose computer, workstation or, alternatively, in a computer network application operating as a dedicated network appliance.

These examples of the different physical and logical characteristics of the output device management service 104 are not exhaustive of all possible locations and capabilities of the service; however, it provides instruction to one of ordinary skill in the art on alternative locations and capabilities.

The user interface 102 provides the user of the universal output device control system access to a common set of command and control parameters to direct the specifics of his/her output options. A detailed description of an exemplary logic process flow for the user interface 102 is provided in FIG. 4, described below. The user interface 102 provides the user with a consistent and universal set of output device options and parameters in order to simplify the use of different individual types of output devices in a common set or class of output devices. For example, when controlling printer output devices, the user interface 102 presents a consistent set of user options, such as stapling, collating, multi-page printing, and others, through a standard set of user dialog screens and menus. The user is able to select the desired output device options using the user interface 102. In certain embodiments described in detail below, the desired options are communicated via communication link 114 to the output device database service 106. The output device database service 106 provides the user with a selection of output device locations near him/her which are capable of satisfying the desired options. Alternatively, the output device database service 106 may select the closest device to the user that is capable of satisfying the specified output device options. After the user selects the output device options using the user interface 102, the output device database service 106 translates the common output device options into output device specific commands or output job data. The interactions between the user interface 102 and the output device database service 106 enable a user to be trained on only one user interface 102 for an entire class of output devices, such as all printing devices, or all facsimile machines, that is universally translated into output device specific commands, thereby reducing training and maintenance costs and making it easier to move and use a variety of output devices.

The user interface 102 and the output device database service 106 may be integrated into the same computer or alternatively be separated over a network. Regardless of integration, the user interface 102 and output device database service 106 communicate through a communication link 114. The communication link 114 may be a combination of PAN, LAN, and WAN links such as Bluetooth, Wi-Fi, Ethernet (wired and fiberoptic), the Internet, and similar mechanisms. The communication link 114 may also be a more traditional device communication link such as RS-232 serial, parallel, USB, Firewire, or a system communication bus such as PCI, PCI Express, and VME. The communication link 114 may enable bi-directional information flow between the user interface 102 and the output device database service 106 to allow information to flow back to the user from the output device database service 106.

The user interface 102 is preferably a program, manifested as a process, thread, or other application run on a computer. The user interface 102 is preferably coded as a conventional software program; however, it may be coded in a number of other forms including, but not limited to, an applet that requires other software to run (e.g., requiring a web browser), a script which is interpreted and run (e.g., written in Java or Python), or a device driver. Regardless of coding, the user interface 102 presents options available to a user in a consistent way for the same class of output devices. The consistent presentation of output device options enables the user to access and set features on a wide variety of different output devices in a similar class without having to learn new or inconsistent interfaces for each device. For example, hardcopy output devices, such as laser, inkjet, thermal transfer, and offset printers, may form a consistent class of devices. The user interface 102 universality across numerous devices reduces the complexity of locating appropriate output devices in a networked environment capable of satisfying desired user needs, thereby in this embodiment, addressing the challenge of properly configuring the output device and loading necessary device drivers. The user interface 102 also collects the user's desired commands and output device option selections and transmits the options over the communication link 114 to the output device database service 106.

The physical implementation of the embodiment may take a number of different forms. For example, all functional elements 100, 102, 104, 106, and target output device 108 may be integrated into a common housing and be implemented such that it is capable of executing on a single computer using internal communication links such as system communications bus(es) to transfer information. Alternatively, some or all of functional elements 100, 102, 104, 106, and 108 may be distributed across multiple machines and connected using a variety of different communication links 110, 112, 114, and 116 including, but not limited to, PAN, LAN, or WAN links. Clearly, a number of different configurations can be constructed by one of ordinary skill in the art using conventional programming and networking techniques. The packaging of data blocks, flow of information, and hosting of specific processing elements and services is independent of the architecture of the system.

Figure 2:
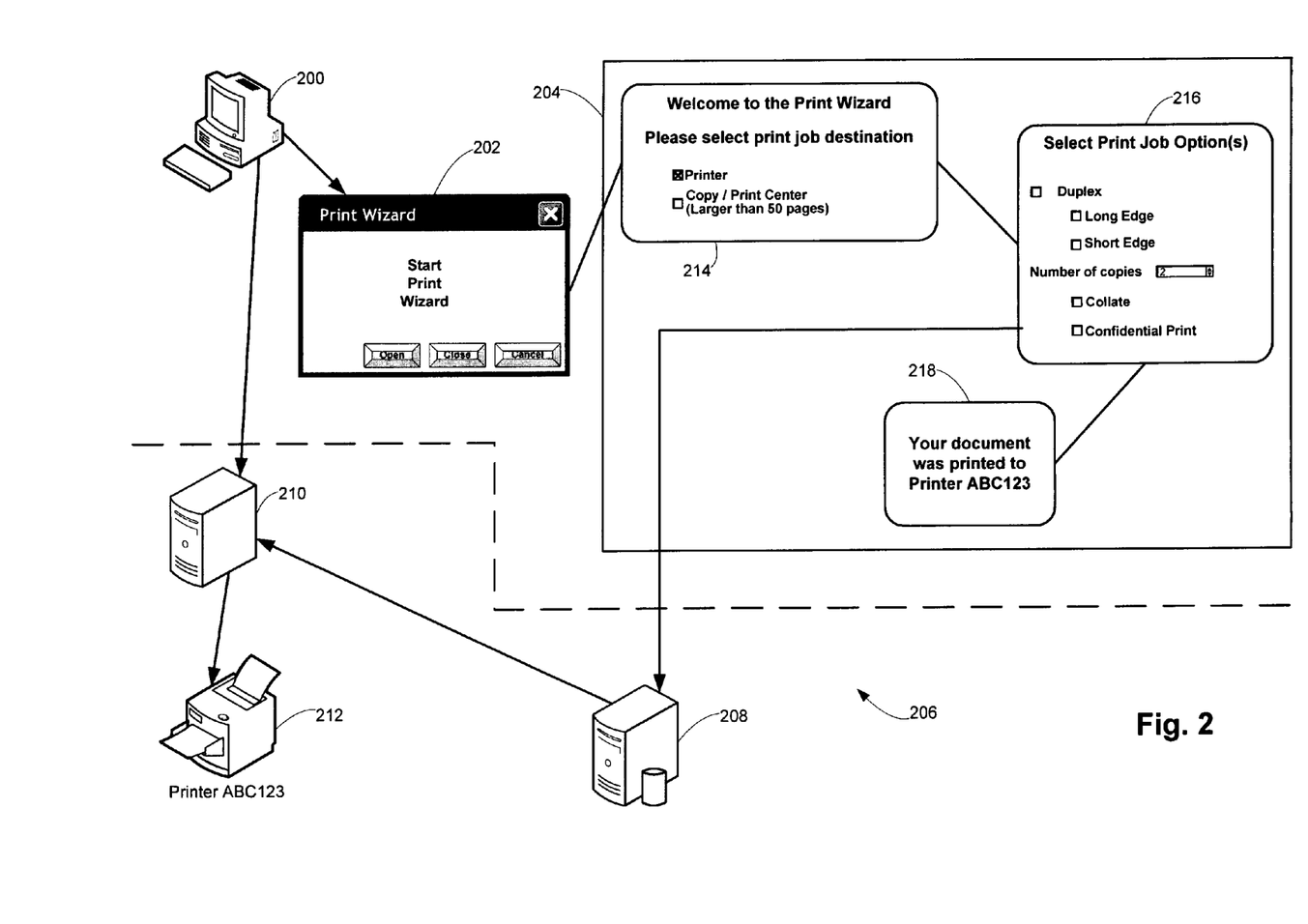
FIG. 2 is a block diagram of an embodiment where the target output location is a network attached printer.

FIG. 2 shows an embodiment of the present invention directed toward the control of a specific class of output devices that are connected directly to the user via a network. In this embodiment, the selected output device is a hardcopy output device, such as a printer. Operations and actions which are localized to a particular computing device, such as computer 200, are shown in the upper portion of the drawing, separated from the remainder by a dotted line. Operations which are occurring through the interconnectivity provided by the LAN are shown in the lower portion of the drawing.

The computer 200 is preferably a workstation being operated by a user who wishes to generate a hardcopy output (a printout) of a document or output job 100 he or she is manipulating or otherwise may access. Functionally, the user triggers a print command inside the respective application or operating system executing on the computer 200. The application then calls the printer service function native to the operating system which starts the user interface 102. The user interface 102 presents the user with an initial dialog box 202 which asks the user if he/she wishes to start a universal print wizard user interface 204. In other embodiments, an initial dialog box 202 may not be present and instead the user directly enters the universal print wizard user interface 204. Alternatively, the print wizard user interface 204 may be accessed via an operating system's native printer interface, operating more like a standard printer driver integrated into the operating system rather than as a stand-alone application.

Upon entering the universal printer wizard interface 204, the user is presented with an initial output selection 214 interface. The initial output selection 214 queries the user's interest in printing the output job 100 on a local output device, such as a printer, connected to the computer 200, on an output device located on the network, or on a output device at an output center, such as a third party print center. The output selection interface 214 in this embodiment is directed towards providing an initial subdivision between low and medium volume printing (local and network printers) or high volume printing (print center).

In the case of this particular embodiment shown in FIG. 2, after selecting the local network printer, the output device options 216 are presented. The output device options 216 reflect the types of features and options which are potentially found on the type of selected output device which, in this example, is a printer device. The output device options 216 presented to the user remain constant regardless of the specific type of printer that handles the output request. This consistent interface enables the user to always experience the equivalent look and feel when printing to an output device in the same general class regardless of the make, manufacturer, or location of the output device. This consistent interface effectively abstracts the details of the specific printer configuration and the need to locate the printer from the user. After the user selects the desired output device options 216 using the output selection interface 214, the device options 216 are sent to the output device database service 106. Also, in this embodiment, the output device database service 106 may be contained on a separate output device database server 208.

The output device database server 208, in this embodiment is a dedicated computer running the output device database service 106. The output device database server 208 takes the information provided by the user through the output device universal print wizard user interface 204, coupled with specific information about the user, such as physical location, and determines the closest available output device, in this example, printer, capable of meeting the desired needs of the user. The output device database server 208 is a machine, in this case located on the network, where at least a portion of its capabilities are allocated, on either a permanent or demand needed basis, running a version of the output device information service 106. The output device database server 208 processes incoming information, determines the most likely printer, generates specific commands or job options necessary for that output device and then dispatches the device specific job options to the output device management server 210. The output device database server 208 may also report back to the user providing feedback on the status 218 of the output job 100 indicating which printer the output job 100 is being sent to, and ultimately, when the output job 100 is released, report back either that the output job 100 is completed or that an error occurred.

In this embodiment, an output device management server 210 receives the output job 100 directly from the user's computer 200. The output device management server 210 is running an instance of the output device management service 104. As noted above, the output job 100 transmitted from the user computer 200 may be in a number of different forms including output device independent form, application form, or an intermediate form. The output device management server 210 holds the output job 100 in a queue until the appropriate output job data, or output device options and commands, are received from the user via the output device wizard user interface 204 and translated by the output device database service 106. The output device management service 106 takes the incoming output job data which includes, but is not limited to, destination pointers describing which target output device location printer or target output device shall be tasked to produce the output, specific target output location printer device instructions which may be appended to the code, and even specific translation instructions which the output device management service 104 will use to translate the device independent print job information into printer codes suitable for the destination printer or output device. The output device management service 104 on the output device management server 210 thus completes the processing necessary for the output job 100 to be sent to a specified target output location 108, such as printer output device 212. In this embodiment, printer output device is shown as a networked attached printer.

The output device application server 210 then transmits the information over the LAN to the target output location 108, printer output device 212. The printer output device 212 may have its own independent print server capable of buffering multiple print jobs. Alternatively, the output device application management server 210 may queue print jobs that are otherwise ready for the printer output device 212 until the printer output device 212 is ready to receive the output job 100. The output device application management server 210 may also continue monitoring the output job 100 after it has been sent to the network printer output device 212 in order to determine when the output job 100 has been completed. Once the output job 100 is completed, the output device management application server may 210 send a message either directly to the user via computer 200 or back to the output device database server 208 and then to the user's computer 200 via status 218 informing the user that the output job has been completed. Alternatively, a similar messaging scheme could be employed to send back a warning that the printing of the output job 100 had failed in some way.

The output device application server 210 may also provide additional redundancy to printing to target output location network devices. For example, if a particular printer output device 212 fails to print an output job 100 due to a local fault, such as the classic paper jam, the output device application management server 210 may then inform the output device database server 208 and ask for printing instructions to send the output job 100, or document, to the next available target location or printer output device that is capable of satisfying the needs of the particular output job 100. The output device database server 208 would then query its database to determine the next nearest target location or printer output device capable of meeting the requirements of the output job 100 and send the new printer routing instructions to the output device management server 210. The output device management server 210 will then create a new device specific integrated output job 100 and send it to another target output location, such as another network attached printer output device (not shown) for printing. The user is then notified of the document rerouting through either the universal print wizard user interface 204 and the feedback on current job status 218 or via a separate message displayed on the user's computer 200.

Figure 3:
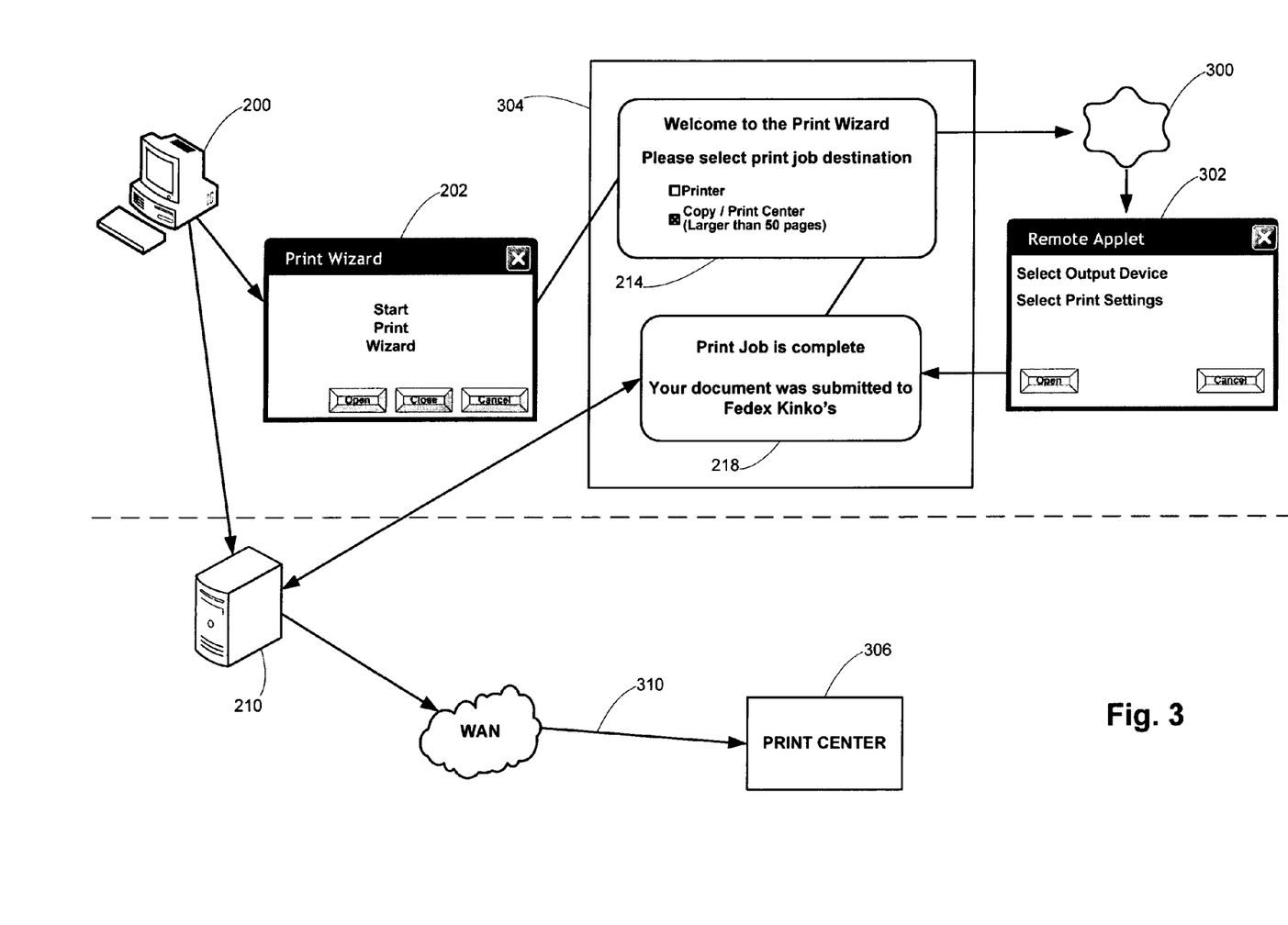
FIG. 3 is a block diagram of an embodiment where the target output location is an external print service.

FIG. 3 is another embodiment of the universal output device control system, whereby the system is used to generate a hardcopy output (print) of output job 100, that he or she is manipulating or can access. In this embodiment, the document or output job 100 is sent over a WAN interface to a remote output center 306, such as a print center in a separate physical location. Operations and actions which are localized to a particular computer 200 are shown in the upper left portion of the FIG. 3, separated by a dotted line. On the right hand portion are operations which are located at a remote output center 306. The lower left hand portion of the drawing shows a LAN network to which the computer 200 is a part.

Similar to the embodiment detailed in FIG. 2, the user initiates the print command inside the respective application or operating system. The application then calls the printer service function native to the operating system which starts the user interface 102. In certain embodiments, the user interface 102 replaces the native printer service of the computer 200. When the user interface 102 starts up, the user is presented with an initial dialog box 202. The initial dialog box 202 in the embodiment shown in FIG. 3 allows the user to select whether or not they will start the universal output print wizard user interface 304. In other embodiments and as discussed above, this initial step may not be present and instead the universal output print wizard user interface 304 starts automatically. In some embodiments, by canceling the universal output print wizard user interface 304 at the initial start screen 202, the user may opt to use instead the print manager native to the operating system and computing environment of the computer 200. Upon entering the universal output print wizard user interface 304, which in this embodiment is customized for printer applications, the initial output selection 214 presents the user the choice between printing the output job 100, to a networked printer on the local LAN or high volume output center. In the embodiment detailed in FIG. 3, the user selected an external output center 306. After selecting the output center 306, the universal output print wizard user interface 304 launches the remote application interface 300 for the external output center 306. The remote application interface 300 is preferably a separate applet, but it may be another application running natively on the computer 200. The remote application interface 300 may also be an applet available from another site via a LAN or WAN connection. The remote application interface 300 opens its own output center dialog 302 to enable the user to specify output device options and instructions for print finishing. After completing the third party output center dialog 302, the unique job data may be fed back to the user via an output job status report 218. The output job 100 routing information is forwarded to the output device application server 210. The output device application server 210 then sends the target output location 108, which is the output center 306, output job data with necessary routing information and commands over a WAN connection 310.

Figure 4:
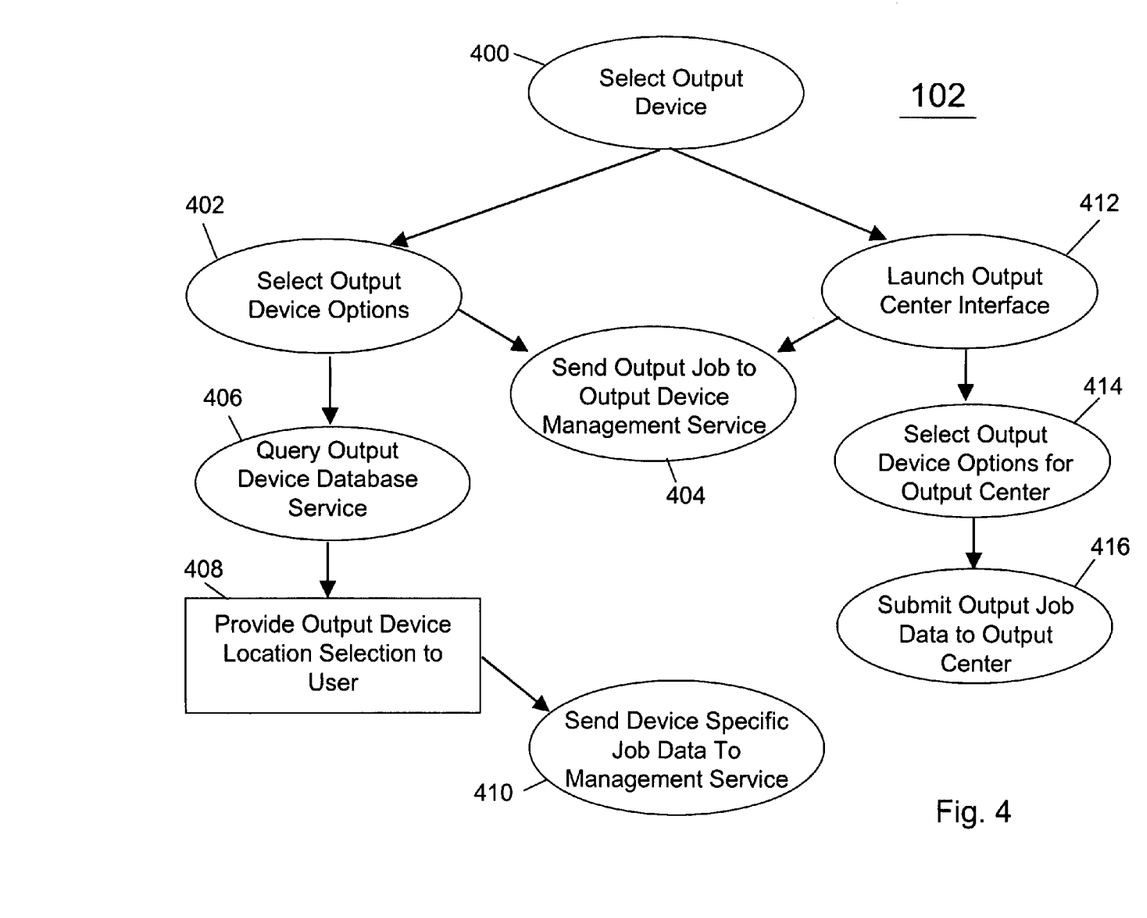
FIG. 4 is an operational flow diagram of a user interface of another embodiment.

Referring now to FIG. 4, this is an operational flow diagram of an embodiment of a user interface 102 of one embodiment of the present invention. The user interface 102 starts when the user initiates the program and selects a specific output function. When the user selects an output function, he/she may be instructing an application to print or fax a document or file, or send a design to a rapid prototyping machine or other output equipment. When the user initiates the system, the native application of the computer 200 may directly call the user interface 102 or call an embedded operating system program that will in turn call the user interface 102. Alternatively the user may start the system directly by the user interface 102 without a specified file.

After the user interface 102 starts, the first query provided to the user is to select 400 the target output location 108 which is the class of output device, if multiple classes are available. For example, in the case of hardcopy output, the user may select either an output center 306 for handling high volume (off-site) printing or an attached output device, such as a network printer to handle low-to-intermediate volume printing.

After selecting the target output location 108, the user may select the desired output device options 402. In the case of network or local printer resources, the user may be presented with a user interface with a selection of different output device options 216 or capabilities that are common for that class of output device. For example, in the case of printers, these capabilities may include stapling, double sided printing, different types of media (letter, A4, legal), folding, and multiple page to a single page printing. The user then selects the desired print features or output device options 402 in the dialog box. In this embodiment, once the user has made his/her selections, a device independent data file containing the output job data is sent 404 to the output device management service 104. The output job data contains any routing instructions and may also include the output device options selected by the user.

If at block 400 the user selected an output device at an output center 306, the user interface 102 may launch the output center interface 300 at block 412. The output center interface 300 is a third party application which the user interface 102 uses to enable the user to select output device options for an output device at the output center 306.

After the output center interface 300 is launched, the user uses the output center interface 306 to select specific output device options 414 or job data (via output center dialog 302) to control the production of the output job 100 at the output center 306. The selected output center 306 job data is submitted to the output center (block 416) which is the target output location 108. The job data is then integrated with the output job 100 sent by the output device management service 104 at the output center 306 to render the output.

Similar to block 402, the output job 100 is also sent to the output device management service 104 at block 404. Instead of sending a device independent data file or output job to the output device, an alternative embodiment may instead receive printer specific encoding information back from the output device database service 106. Then, the output job 100 could be encoded into a format which is appropriate for the desired destination output device, printer, and then sent 404 to the output device management service 104. Alternatively, a partially encoded output job 100 may be submitted.

Regardless of the type of output job 100 sent to the output device management service 104, there is a code or identification or other means for associating job data with the output job 100 sent by the output device management service 104 in order for the resulting output device specific instructions to be synched with the job data file. The identification and syncing of the output job 100 and job data may be accomplished through a number of different methods. For example, the data could be assigned a unique identification number based on the file information, or date, time, and origination stamps, originating user information. The unique identification number may also simply be a logical pointer to the location of the output job 100 stored on the output device management server 210. The identification may also provide specific functional information or be a wrapper, such as a series of extensible markup language (XML) tags around the file that enable the device specific commands to be linked with the date file. Regardless of identification technique, information necessary to match the output job 100 to the output device specific job data commands is provided to the output device database service 106 as part of the database query 406 or to the output center 306 in the case of an off-site output job 100.

The database query 406 from the user interface 102 includes user selected output device options 216 from block 402 and the information necessary to specify which output job 100 on the output device management service 104 is to be associated with the output device specific job data produced by the database query 406. The database query 406 produces desired output device options 216 and optionally match the requesting user's physical location with the database of output devices maintained by the output device management service 104.

The database of output devices may be managed and updated by the output device database service 106 using either automatic discovery techniques to search a network or subnet either continuously, at regular intervals, or on command to identify and catalog output device resources. Another alternative would be to catalog output devices using manual techniques, whereby new devices are added and cataloged to the database through user or system administrator interaction. In addition to tracking the output devices accessible on the network, the output device management service 106 tracks and stores the capabilities of each individual output device on a network. For example, for printers, the output device database service 106 may track the ability of a given network printer to collate, staple, fold, or double side print output documents. Further, the output device database service 106 may also track user permissions for access to specific network devices, thereby enabling devices to be restricted to only specific users or classes of users and even maintain account tracking and account information regarding the type, quantity, number of output jobs 100 sent to a specific output device and payment information associated with the output job 100. The output device database service 106 can maintain of this information in a number of different database types, including, but not limited to, object-oriented, flat file, relational, and associative structures.

Based on the results of the query submitted to the database (block 406) reflecting the desired user print options, potentially the user location, and the available output devices capable of producing the desired output, a list of potential output devices, or printers, is produced (block 408). The user may then select the desired printer for the output and inform the output device database service 106. The user interface 102 then takes the additional information from the user and performs another database query. In this case, the database query is focused on producing the required printer specific codes, translation coder-decoder (codec) for transforming the output job being temporarily stored with the output device management service 104, destination information, and instructions regarding with which file the printer commands should be linked. Together all this information is referred to as job data. The job data is arranged in a data package or stream and sent to the output device management service 104 at block 410. The information sent may be encapsulated using an XML wrapper to identify the information enclosed in the output device specific format. Alternatively, the information may be integrated in other open or proprietary methods to assist in integration with the device output job on the output device management service 104.

Figure 5:
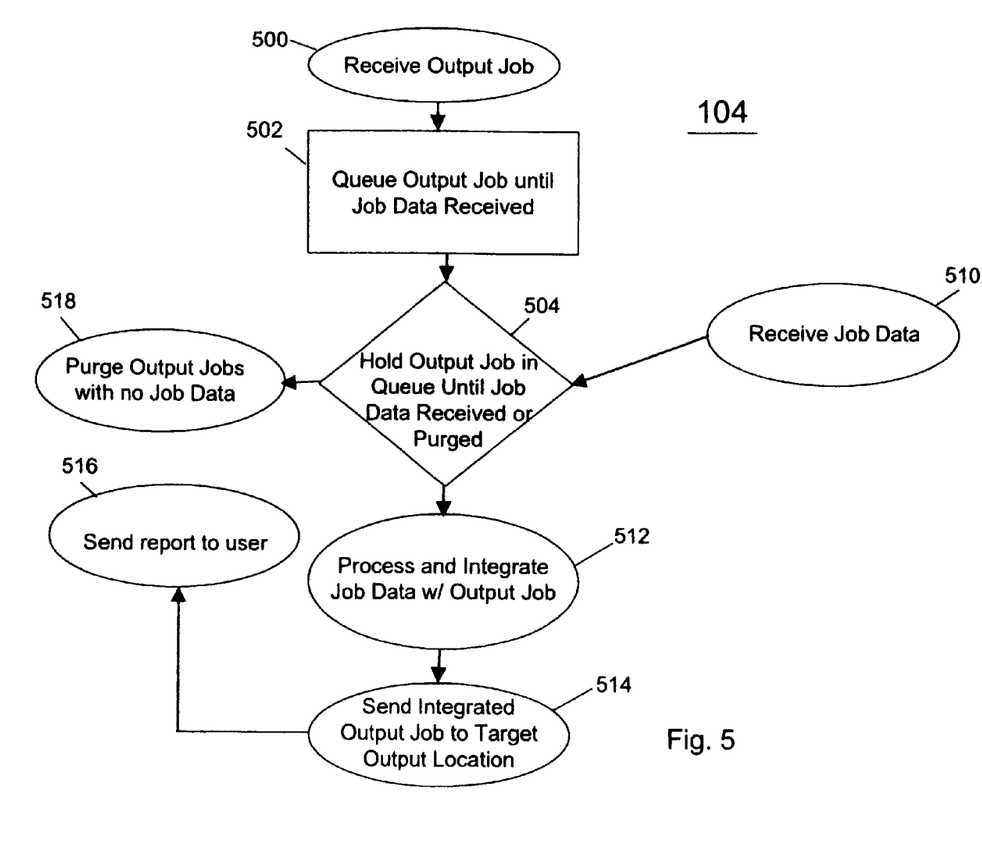
FIG. 5 is an operational flow diagram of an output device service of another embodiment.

FIG. 5 is a logical diagram detailing the operational flow of the output device management service 104. The output management device service 104 receives an output job 100 from the user application at block 500. The received output job 100 is queued (block 502) until job data is received from the output device management service 104 which occurs at block 510. The queue of block 504 is nominally asynchronous in that the received output job 100 is held until appropriate routing information is obtained from the output device database service 106. The queue is monitored using a number of techniques, including a straightforward time limit whereby after a specified amount of time, if no routing information is obtained the queued document may be flushed or purged (block 518). The amount of time and methods used may be adjusted based on the amount of storage capability available to the output device management service 104. When the output device specific commands and job data are received (block 510), the output job 100 and job data are removed from the queue, and the information is processed and integrated (block 512). The processing and integration of the output device specific information (block 510) with the output job 100 occurs in the output device management service 104. The processing (block 512) may require conversion of the output data file. This processing may occur using native converters. Alternatively, the processing (block 512) may use a codec supplied by the output device database service 106 as part of the job data. The processed output job 100 is then integrated with the output device specific job data, including necessary output device commands, thereby creating an integrated output job 100. Finally, the output device management service 104 sends the integrated output job 100 to the selected output device (block 514). When the output job 100 is sent to the output device, the service may send a report (block 516) back to the user reporting successful completion of the task. The report of block 516 may be sent back directly to the user or alternatively sent back to the user through the output device database service 106. Optionally, the output device management service 104 may monitor the output device to ensure successful completion of the output job 100 and provide either continuous or discrete updates on the progress of a specific output job 100.

Figure 6:
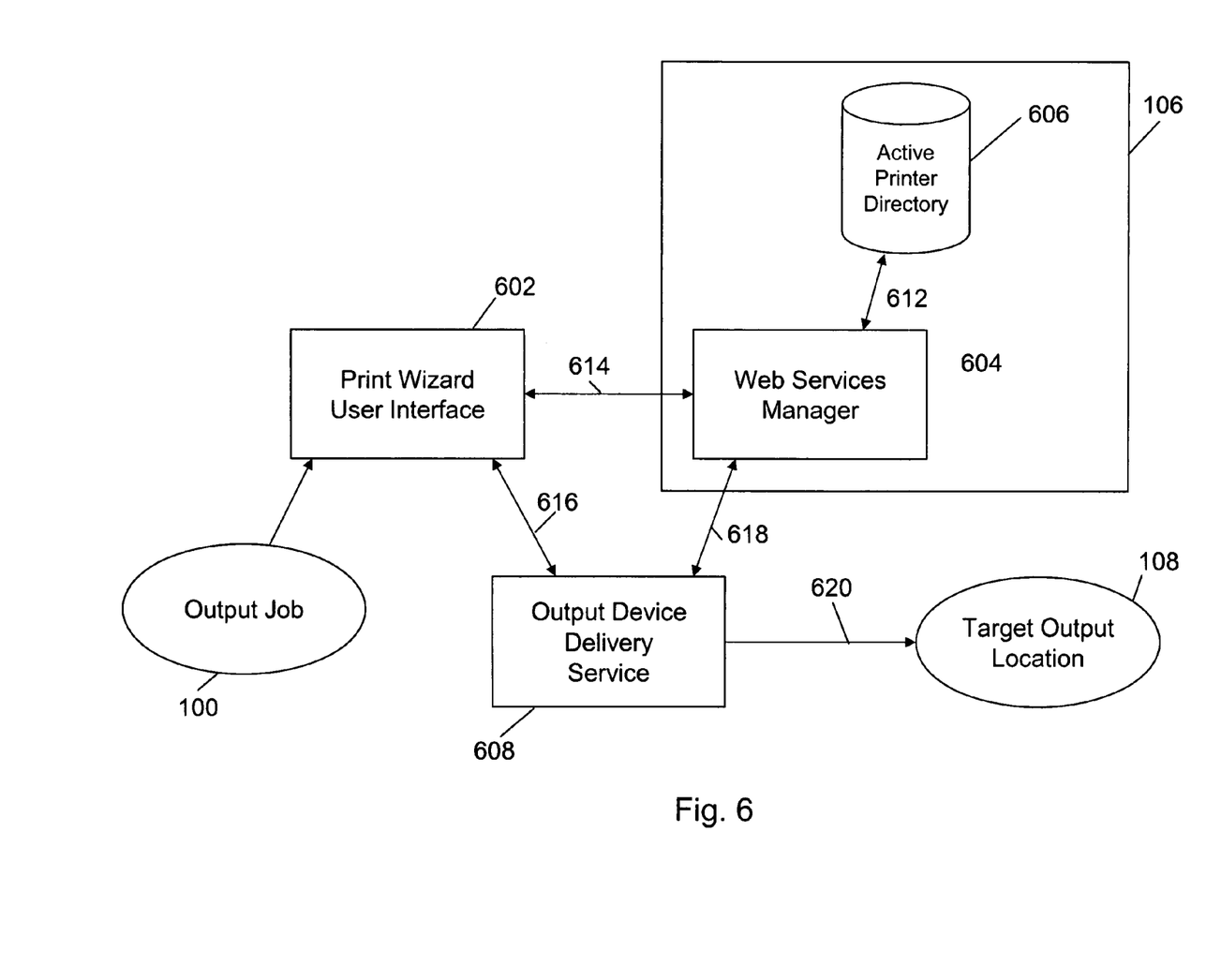
FIG. 6 is a block diagram showing the functional elements of an exemplary embodiment of the universal output control system.
Figure 7:
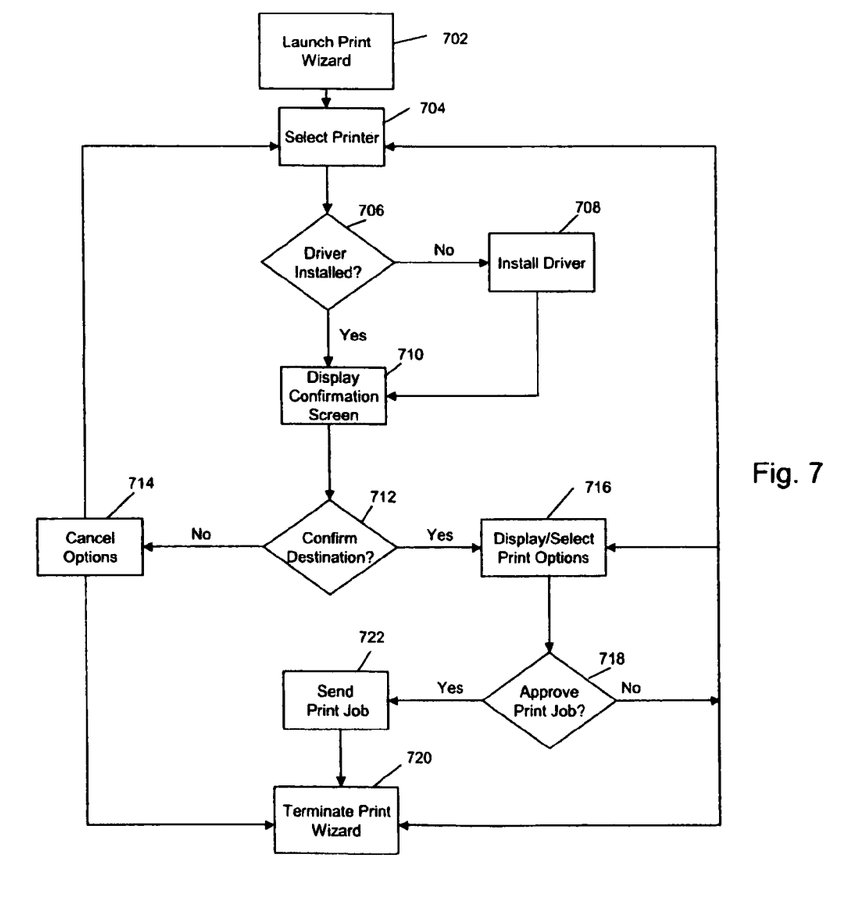
FIG. 7 is an operational flow diagram of the exemplary embodiment of FIG. 7.

FIGS. 6 and 7 show an exemplary embodiment of the universal output device control system (System) 600 of the present invention wherein FIG. 6 is a block diagram showing the functional elements. As with the previous embodiment, the System 600 is a universal printing application that directs output jobs 100 to output devices, such as printers, near the user that meet the user's output criteria while employing a common user interface for submitting all output jobs 100 to printer output devices or target output locations 108 connected within the System 600. The System 600 is described in terms of the target output location 108 being a printer; however, this is for convenience only. It would be readily apparent to one of ordinary skill in the art to design and implement the System 600 wherein the target output location 108 is a printer, facsimile, or multi-functional device capable of performing printing in addition to at least one other function such as scanning, copying or faxing, that is connected directly via a network or is an output device located at a third party vendor, or output center 306.

The exemplary embodiment shown in FIG. 6 is similar in structure and operation as the embodiment discussed above in connection with FIGS. 1-5. The System 600 provides a user with a common set of command and control parameters for searching, identifying, and selecting a target output location 108 capable of satisfying the needs of the output job 100.

Upon initiation by a user, a print wizard user interface 602, which consists of multiple user screens for receiving the user's print commands, is launched. Preferably, and similar to the previous embodiment, the print wizard user interface 602 is software program, or applet, executing on a computer 200 that functions as a node or client server within a network. In particular, the hardware configuration for executing the print wizard user interface 602 depicted in FIG. 6 is a computer system executing Windows 2000, XP, or 2003, having a minimum of 128 MB RAM, and approximately 100 MB available disk space mostly for storing the various print drivers. The print wizard user interface 602 provides a universal user interface for all users connected to the System 600.

The print wizard user interface 602 communicates with the output device database service 106 which, similar to the previous embodiment, provides the user with information on available printers and print options. However, in this exemplary embodiment, the output device database service 106 has a web services manager 604 that provides directory lookup 612 services to an active printer directory 606. The active printer directory 606 is a database containing information on all available output devices in, or accessible by, the System 600. In particular, for each such output device, the active printer directory 606 contains information regarding the device identifier tag, vendor, device characteristics and operational features, device driver, and the device location. A printer administrator may optionally populate and maintain the information stored in the active printer directory 606 using conventional database processing techniques. Alternatively, the active printer directory 606 may update itself periodically through active queries of the output devices attached to the network. Also, the web services manager 604 and active printer directory 606 preferably reside on a network server connecting multiple client servers or computers 200.

The print wizard user interface 602 communicates 614 with the Web Services Manager 604 regarding search and configuration information, driver installation, and print reports. That is, the print wizard user interface 602 inquires of the web services manager 604 as to the availability and features of certain printers (collectively, printer information). Also, if the user selects a printer via the print wizard user interface 602 for which the printer driver is not installed on the user's computer 200, the web services manager 604 may retrieve the requested print driver from either the active directory 606, or another storage location, and then install that print driver on the user's computer 200. The printer wizard user interface 602 may also send print reports containing various statistical and metric information regarding a print job, selected printers, user name, number of pages, and the like, to the web services manager 604. The web services manager 604 uses such reports in the management and maintenance of the printers 108 connected to the System 600.

An output device delivery system 608 is a software program that can reside on any of several different locations, such as a client server or a separate print server. In one embodiment, the output device delivery system 608 is installed on every network segment that is required to control and manage the printers and output devices servicing that network segment. The print wizard user interface 602 communicates 616 with the output device delivery service 608 by sending via link 620 the output job 100 for printing, or outputting, on the target output location 108 with the output device options. In addition, the output device delivery service 608 responds to discovery requests by the print wizard user interface 602 wherein the print wizard user interface 602 requests a list of local target output locations 108, such as printers. The output device delivery service 608 may send print reports, containing various statistical and metric information regarding a print job, selected printers, and the like, to the web services manager 604. The web services manager 604 uses such reports in the management and maintenance of the printers connected to the System 600.

FIG. 7 is an operational flow diagram of the exemplary embodiment of the universal output control device system (System) 600. Processing begins at block 702 wherein a user accesses the user interface or operating system on a computer 200 and launches the print wizard user interface 602. In this embodiment, the user simply clicks on a desktop shortcut icon or taskbar icon to initiate the print wizard user interface 602. Also, the print wizard user interface 602 of this embodiment integrates elements of the initial dialog box 202 and print wizard user interface 204 discussed above.

Upon being launched, the print wizard user interface 602 proceeds to block 704 and displays a select printer screen, through which the user chooses which printer, or target output location 108, he/she wants to print, or output, the output job 100. The select printer screen, which may be a conventional dialog box or other user interface, as are known in the art, presents the user with multiple ways to select a printer. For example, there may be selection tabs, each of which offer the user a different selection process.

For example, the select printer screen may have, by way of example and not limitation, three selection tabs: a History tab, a Discovered tab, and a Search tab. The History tab displays a list of printers that are frequently or recently used. The list of printers may be listed in any such order (frequency or most recent first), as well as, may be grouped by location or other macro-level grouping. Also, the attributes for each listed printer may be is displayed to provide additional information to the user such as to the status or printing features of each printer. The attributes may include icons for color, duplexing, confidential printing, and a number showing the page count limit.

Upon selecting and activating the Discovered tab, the print wizard user interface 602 may display the printers that are connected to the local network to which the user's computer 200 is connected. Thus, the listed printers will most likely be those printers that are in close proximity to the user. Operationally, upon selecting the Discovered tab, the print wizard user interface 602 sends an inquiry to the output device delivery service 608 for a list of the printers that are connected to the local network. The output device delivery service 608 polls the local network, and compiles and returns the list to the print wizard user interface 602 for display. This Discovered functionality of the print wizard user interface 602 enables a user to have a first tier searching capability for available printers wherein the first tier search is limited to searching the immediate local network.

Upon selecting and activating the Search tab, the print wizard user interface 602 enables the user to search the entire network beyond the local network for a list of alternative printers available to the user for printing the output job 100. Operationally, upon selecting the Search tab, the print wizard user interface 602 sends an inquiry to the web service manager 604 for a list of all target output locations 108 accessible via the entire network. The target output locations 108 may be any accessible printer, facsimile machine, multi-function device, scanner, or third party print vendor. The web service manager 604 accesses the active printer directory 606 for the requested list of target output locations 108, and returns the list to the print wizard user interface 602 for display.

Also available to the user from the select printer screen may be one or more filters used to filter the list of printers displayed in the various tabs. In the exemplary embodiment, the filters may be shown on the bottom of the select printer screen wherein the user enters any desired filter criteria. Possible filter criteria may include, but not be limited to: paper size, duplex, color, security, and finishing options. Also in the exemplary embodiment, the filters have the following possible filter criteria values;

Setting filters:

--- paper size - letter, legal, tabloid, A4
duplex - long edge, short edge
security - confidential, none

---

Capabilities:

--- color - mono, color
sort - bin1, bin2, bin3
staple - front, back, auto, dual
hole punch - off, on

---

Once a user enters filter criteria, the printer wizard user interface 602 only displays those printers for a selected tab that satisfy the entered filter criteria.

An alternative selection process for each tab is the use of the search window on the select printer screen. The user enters one or more key words in the search window, and upon activating the search soft button, the printer wizard user interface 602 searches the list of printers for display for all matching key words and displays those printers that satisfy the key words.

Once the user finds the printer of choice, by any of the methods discussed above, the user simply selects that printer. Such selection may occur in any number of manners, such as by highlighting it on the select printer screen or selecting it from a pull-down menu. Upon selection, the processing moves to block 706 on FIG. 7. At block 706, the printer wizard user interface 602 determines whether the print driver for the selected printer has been installed on the user's computer 200. If the print driver has not been installed, processing continues to step 708. In step 708, the printer wizard user interface 602 communicates with the web services manager 604, requesting the appropriate print driver. The web services manager 604 accesses the active printer directory 606 with the printer identifier for the selected printer, retrieves the print driver, and sends the print driver back to the printer wizard user interface 602. Upon receipt, the printer wizard user interface 602 installs the print driver on the user's computer 200. The installation process of a print driver is preferably performed and completed automatically without any involvement from the user. Also, notice to the user of the completion of the installation process is optional. Processing continues to block 710.

Returning again to step 706, if the printer wizard user interface 602 determines that the print driver for the selected printer is already installed on the user's computer 200, the printer wizard user interface 602 proceeds to block 710.

At block 710, the printer wizard user interface 602 may display a user interface printer confirmation screen. The user interface printer confirmation screen enables the user the opportunity to review and confirm the printer selection for the output job 100. The selected printer name may be shown along with a display of the printer settings.

Proceeding to block 712, the user determines whether to approve the print job or not. If the user decides not to approve the print job, the user may select a reset or cancel button on the user interface printer confirmation screen. Processing continues to block 714 wherein the user decides whether to select a different printer or to terminate the printer wizard user interface 602. If the user determines to select another printer, processing returns to block 704 which is discussed in detail above. If the user determines to terminate the print job altogether, processing proceeds to block 720 wherein the print wizard user interface terminates and closes.

Returning to block 712, if the user determines to approve the current print job, processing proceeds to block 716. At block 716, the printer wizard user interface 602 displays to the user a conventional print dialog screen in which the user selects print options, including, page range, collation, orientation, duplex, number of copies, paper types, and other conventional print options. In the exemplary embodiment, the print dialog screen is unique for the select printer and is vendor specific. Once the user chooses the desired print options, the user selects the OK or PRINT soft button to initiate the outputting of the output job 100 on the target output device 108 or selected printer.

Processing proceeds to block 718, wherein the print wizard user interface 602 presents the user with an approval print job screen which provides one final confirmation to the user that the output job 100 is to be submitted for printing. If the user approves the printing of the output job 100, the print wizard user interface 602 immediately continues to block 722 wherein it transmits a device specific output job 100, which has the selected print options, to the selected printer. In particular, the print wizard user interface 602 sends the output job 100 to the output device delivery service 608 for output on the target output location 108. The output device delivery service 608 may temporarily buffer the output job 100 prior to printing or may be a print server for queuing the output job 100 with other output jobs. The print wizard user interface 602 may optionally present the user with a print complete notice before proceeding to block 720. At block 720, the print wizard user interface 602 terminates and closes its windows. As part of the print wizard user interface 602 termination process, a report of the completed print job may be send to the web services manager 604.

Returning to block 718, if the user determines to not approve the current print job, the user may cancel the output job at which time the print wizard user interface 602 presents the user with the option to select a new printer, keep the currently selected printer but select alternative printer options, or terminate the print wizard user interface 602. If the user determines to select another printer, processing returns to block 704 which is discussed in detail above. If the user determines to terminate the print job altogether, processing proceeds to block 720 wherein the print wizard user interface may terminate and close. Lastly, if the user determines to keep the currently selected printer but selects different print options, processing returns to block 716 which is discussed in detail above.

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A system for outputting an output job at a target output location, comprising:
    a means for storing an output job on an output management application service;
    a user interface in communication with said output management application service, one or more output devices, and one or more output centers, said user interface comprising:
        a means for automatically selecting a target output location, said target output location being based upon a proximity of a user to at least one of said one or more output devices and one of said one or more output centers;

a means for selecting one or more output device options associated with said target output location; and a means for generating output job data, said output job data containing one or more routing instructions and said output device options;

a means for transmitting said output job data to said target output location via said output management application service; and a means for transferring the output job from said output management application service to said target output location, wherein said one or more output device options is at least one of stapling, collating and multipage printing.

2. The system according to claim 1, further comprising a means for integrating the output job and said output job data, thereby generating an integrated output job that is transferred to said target output location.

3. The system according to claim 1, wherein said user interface further comprises a means for reporting a status of the output job on said target output location.

4. The system according to claim 1, wherein said target output location is an output device and further comprising an output information database service wherein said user interface transmits said output device options to said output information database service for generating said output job data and said means for transmitting transmits said output job data from said output information database service to said output management application service.

5. The system according to claim 1, wherein said target output location is an output center and said user interface further comprising a means for launching an output center interface for selecting said one or more output device options and generating output job data.

6. The system according to claim 1, wherein said output device is selected from a group consisting of: a printer, a facsimile, and a multi-functional peripheral.

7. The system according to claim 1, wherein said output center is an external print center.

8. The system according to claim 1, wherein said target output location is accessible through a PAN, LAN, or a WAN.

9. The system according to claim 1, wherein said output job data further comprising device specific translation instructions to be used by said output management application service to translate device independent output job into printer codes suitable for said target output location.

10. A method for outputting an output job at a target output location, comprising:

storing an output job on an output management application service;

automatically selecting a target output location, said target output location being based upon a proximity of a user to at least one of said one or more output devices and one of said one or more output centers;

selecting one or more output device options associated with said target output location;

generating output job data, said output job data containing one or more routing instructions and said output device options;

transmitting said output job data to said target output location via said output management application service; and transferring the output job from said output management application service to said target output location, wherein said one or more output device options is at least one of stapling, collating and multipage printing.

11. The method according to claim 10, further comprising a user interface for communicating with said output management application service and said target output location, wherein said user interface performs said selecting said target output location and said selecting said output device options.

12. The method according to claim 10, further comprising holding the output job by said output management application service, wherein said transferring the output job is performed upon receipt of said output job data.

13. The method according to claim 10, wherein said target output location is an output device.

14. The method according to claim 13, further comprising integrating the output job and said output job data and generating an integrated output job that is transferred to said target output location.

15. The method according to claim 10, further comprising reporting a status of the output job being output on said target output location.

16. The method according to claim 10, wherein said target output location is an output device and further comprising an output information database service that performs said generating said output job data and said transmitting said output job data from said output information database service to said output management application service.

17. The method according to claim 10, wherein said target output location is an output center and further comprising launching an output center interface for said selecting said one or more output device options and for said generating said output job data.

18. The method according to claim 10, wherein said output device is selected from a group consisting of: a printer, a facsimile, and a multi-functional peripheral.

19. The method according to claim 10, wherein said output center is an external print center.

20. A system for outputting an output job at a target output location, comprising:

a user interface executing on a computer in communication with a web services manager of a network and an output device delivery service;

a means for generating a list of available target output locations, said means providing search capabilities of an active printer database in communication with said web services manager and filtering capabilities;

a means for displaying said list of available target output locations;

a means for selecting a target output location, said target output location being automatically selected based upon a proximity of a user to said available target output locations;

a means for installing a driver for said target output location if said driver is not previously installed on the computer; and a means for submitting the output job to said target output location with an output option, the output option being at least one of stapling, collating and multipage printing.

* * * * *